(12) United States Patent
Rinehart et al.

(10) Patent No.: US 8,403,401 B2
(45) Date of Patent: Mar. 26, 2013

(54) ADJUSTABLE AIR-DEFLECTING PANEL FOR A VEHICLE

(75) Inventors: Dawn M Rinehart, Portland, OR (US);
Robby L Minyard, Battle Ground, WA (US); Steven C Griffiths, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 222 days.

(21) Appl. No.: 12/833,642

(22) Filed: Jul. 9, 2010

(65) Prior Publication Data
US 2011/0042998 A1  Feb. 24, 2011

Related U.S. Application Data

(60) Provisional application No. 61/275,081, filed on Aug. 24, 2009.

(51) Int. Cl.
*B60J 9/00* (2006.01)
(52) U.S. Cl. .................................................. 296/180.3
(58) Field of Classification Search ............... 296/180.3, 296/146.11, 180.1, 191, 26.11, 57.1; 280/154; 52/208
See application file for complete search history.

(56) References Cited

U.S. PATENT DOCUMENTS

| | | | |
|---|---|---|---|
| 2,101,793 A | 12/1937 | Field, Jr. | |
| 3,711,146 A | 1/1973 | Madzsar et al. | |
| 4,102,548 A | 7/1978 | Kangas | |
| 4,375,898 A * | 3/1983 | Stephens | 296/180.3 |
| 4,458,937 A * | 7/1984 | Beckmann et al. | 296/180.3 |
| 4,462,628 A * | 7/1984 | Gregg | 296/180.3 |
| 4,518,188 A | 5/1985 | Witten | |
| 4,607,874 A | 8/1986 | Peairs | |
| 4,611,796 A * | 9/1986 | Orr | 296/180.2 |
| 4,611,847 A | 9/1986 | Sullivan | |
| 4,750,772 A | 6/1988 | Haegert | |
| 4,775,179 A * | 10/1988 | Riggs | 296/180.2 |
| 4,779,915 A * | 10/1988 | Straight | 296/180.3 |
| 4,824,165 A * | 4/1989 | Fry | 296/180.3 |
| 4,883,307 A | 11/1989 | Hacker et al. | |
| 4,887,681 A * | 12/1989 | Durm et al. | 180/68.1 |
| 4,904,015 A * | 2/1990 | Haines | 296/180.3 |
| 5,078,448 A | 1/1992 | Selzer | |
| 5,141,281 A * | 8/1992 | Eger et al. | 296/180.5 |
| 5,165,751 A * | 11/1992 | Matsumoto et al. | 296/180.5 |
| 5,174,626 A * | 12/1992 | Wiley et al. | 296/180.1 |
| 5,234,249 A * | 8/1993 | Dorrell | 296/180.1 |
| 5,236,242 A * | 8/1993 | Seeman | 296/180.1 |
| 5,317,880 A * | 6/1994 | Spears | 62/239 |
| 5,348,366 A * | 9/1994 | Baker et al. | 296/180.4 |
| 5,536,062 A | 7/1996 | Spears | |
| 5,538,316 A * | 7/1996 | Bartholomew | 296/180.5 |

(Continued)

FOREIGN PATENT DOCUMENTS

DE  3620843 A1  12/1987
GB  2089303 A  6/1982

*Primary Examiner* — Kiran B Patel
(74) *Attorney, Agent, or Firm* — Klarquist Sparkman, LLP

(57) ABSTRACT

An adjustable air-deflecting panel for mounting to a vehicle comprises at least one panel; a plurality of mounts for mounting the panel to the vehicle, each mount comprising a vehicle mount portion for mounting to the vehicle and a panel mount portion for mounting the panel to the vehicle mount portion, the mount portions being pivotally coupled to one another to thereby pivotally couple the panel to the vehicle, the vehicle mount portion comprising a first engagement member and the panel mount portion comprising a second engagement member, the engagement members being operable to engage one another upon clamping the engagement members together to thereby prevent pivoting of the panel about the pivot axis and relative to the vehicle.

11 Claims, 4 Drawing Sheets

U.S. PATENT DOCUMENTS

| | | | |
|---|---|---|---|
| 5,658,038 A | 8/1997 | Griffin | |
| 5,855,404 A * | 1/1999 | Saunders | 296/78.1 |
| 5,896,564 A * | 4/1999 | Akama et al. | 455/575.9 |
| 5,923,245 A * | 7/1999 | Klatt et al. | 340/479 |
| 6,039,385 A * | 3/2000 | Husted | 296/180.3 |
| 6,099,069 A * | 8/2000 | Spears | 296/180.2 |
| 6,139,090 A * | 10/2000 | Stidd | 296/180.5 |
| 6,170,904 B1 * | 1/2001 | Schaedlich et al. | 296/180.1 |
| 6,183,041 B1 * | 2/2001 | Wilson | 296/180.1 |
| 6,206,331 B1 * | 3/2001 | Keith et al. | 248/74.1 |
| 6,257,654 B1 * | 7/2001 | Boivin et al. | 296/180.5 |
| 6,267,434 B1 * | 7/2001 | Casillas | 296/180.1 |
| 6,309,010 B1 * | 10/2001 | Whitten | 296/180.4 |
| 6,338,524 B1 * | 1/2002 | Wu | 296/180.1 |
| 6,378,932 B1 * | 4/2002 | Fasel et al. | 296/180.5 |
| 6,428,084 B1 * | 8/2002 | Liss | 296/180.3 |
| 6,485,087 B1 * | 11/2002 | Roberge et al. | 296/180.5 |
| 6,520,564 B1 * | 2/2003 | Liang | 296/180.5 |
| 6,527,334 B2 * | 3/2003 | Oliver | 296/180.1 |
| 6,540,282 B2 * | 4/2003 | Pettey | 296/180.5 |
| 6,799,791 B2 * | 10/2004 | Reiman et al. | 296/180.1 |
| 6,817,433 B1 * | 11/2004 | Bergstrom et al. | 180/89.12 |
| 6,846,035 B2 * | 1/2005 | Wong et al. | 296/180.1 |
| 6,854,788 B1 * | 2/2005 | Graham | 296/180.4 |
| 6,886,882 B2 * | 5/2005 | Farlow et al. | 296/180.4 |
| 6,926,346 B1 * | 8/2005 | Wong et al. | 296/180.5 |
| 7,055,890 B1 * | 6/2006 | Crean | 296/180.1 |
| 7,240,958 B2 * | 7/2007 | Skopic | 296/180.1 |
| 7,374,229 B1 | 5/2008 | Noll et al. | |
| 7,438,347 B2 * | 10/2008 | Froeschle et al. | 296/180.5 |
| 7,481,482 B2 * | 1/2009 | Grave et al. | 296/180.5 |
| 7,641,262 B2 * | 1/2010 | Nusbaum | 296/180.5 |
| 7,712,822 B2 * | 5/2010 | Pfaff | 296/180.2 |
| 7,850,224 B2 * | 12/2010 | Breidenbach | 296/180.1 |
| 7,876,202 B2 * | 1/2011 | Liljeblad et al. | 340/431 |
| 7,930,979 B2 * | 4/2011 | Iden et al. | 105/1.1 |
| 7,942,466 B2 * | 5/2011 | Reiman et al. | 296/180.4 |
| 7,950,720 B2 * | 5/2011 | Skopic | 296/180.1 |
| 7,976,096 B2 * | 7/2011 | Holubar | 296/180.1 |
| 7,984,920 B2 * | 7/2011 | Alguera | 280/438.1 |
| 8,033,594 B2 * | 10/2011 | Nusbaum | 296/180.4 |
| 8,075,046 B2 * | 12/2011 | Pursley | 296/180.2 |
| 8,083,284 B1 * | 12/2011 | Logounov | 296/180.2 |
| 8,162,382 B2 * | 4/2012 | Hjelm et al. | 296/180.3 |
| 8,196,993 B2 * | 6/2012 | Smith | 296/180.3 |
| 2007/0257513 A1 | 11/2007 | Schwartz | |
| 2008/0036173 A1 * | 2/2008 | Alguera | 280/407 |
| 2009/0160159 A1 * | 6/2009 | Alguera | 280/438.1 |
| 2009/0184539 A1 | 7/2009 | Pursley | |
| 2009/0200834 A1 * | 8/2009 | Vogel et al. | 296/180.3 |
| 2009/0248242 A1 | 10/2009 | Cohen et al. | |
| 2010/0060029 A1 | 3/2010 | Hjelm et al. | |
| 2011/0081853 A1 * | 4/2011 | Roebuck | 454/307 |
| 2011/0115254 A1 * | 5/2011 | Skopic | 296/180.3 |
| 2011/0241377 A1 * | 10/2011 | Rogers et al. | 296/180.3 |
| 2012/0025565 A1 * | 2/2012 | Nusbaum | 296/180.4 |
| 2012/0139290 A1 * | 6/2012 | Kenevan | 296/180.3 |
| 2012/0139291 A1 * | 6/2012 | Nusbaum | 296/180.4 |

* cited by examiner

ADJUSTABLE AIR-DEFLECTING PANEL FOR A VEHICLE

CROSS REFERENCE TO RELATED APPLICATIONS

The present application claims the benefit of U.S. Provisional Application No. 61/275,081, filed Aug. 24, 2009.

FIELD

The present disclosure relates to vehicles, such as trucks, with adjustable air-deflecting panels that assist in deflecting air away from a trailer when the vehicle is being used to tow a trailer, and also to adjustable mounts for air-deflecting panels.

BACKGROUND

Aerodynamic drag can account for a majority of a vehicle's total fuel consumption at highway speeds. With a tractor towing a trailer, a gap exists between the tractor and trailer which tends to trap air, creating a low-pressure wake behind the tractor, resulting in a net pressure difference and, therefore, creating drag. One solution has been to use fixed side extenders and/or spoilers to reduce the effect of unwanted drag. Fixed side extenders are typically rigid, planar panels that extend rearward from the cab of the vehicle. Fixed side extenders are typically designed for specific trailer gap sizes and cannot be adjusted for different trailers and different driving conditions. Furthermore, fixed side extenders may be damaged when the truck is being towed in a backward direction.

SUMMARY

Embodiments of adjustable air-deflecting panels for mounting to a vehicle as well as systems and methods for mounting and adjusting the panels are described herein.

One exemplary embodiment comprises at least one air-deflecting panel and a plurality of mounts adapted for mounting the panel to the vehicle. Each mount includes a first vehicle mount portion adapted for mounting to the vehicle and a second panel mount portion adapted for mounting to the panel. The panel mount portion can be an integral part of the panel and need not be a separate component. The first vehicle mount portion is pivoted to the second panel mount portion so as to pivot about an axis to thereby pivotally couple the panel to the vehicle for pivoting about the pivot axis. The first vehicle mount portion has a first engagement surface and the second panel mount portion has a second engagement surface, the first and second engagement surfaces sliding adjacent to one another as the panel is pivoted from one position to another position. The first and second engagement surfaces include respective inter-engaging features that engage one another upon clamping the first and second engagement surfaces together to thereby prevent pivoting of the panel about the pivot axis relative to the vehicle. In some of these embodiments, the inter-engaging features can include plural detents.

An exemplary mounting assembly for mounting an adjustable air-deflecting panel to a vehicle includes a vehicle mount portion adapted for mounting to the vehicle and a panel mount portion adapted for mounting to or comprising a portion of the panel. The vehicle mount portion is pivoted to the panel mount portion so as to pivot about a pivot axis to pivotally couple the panel to the vehicle for pivoting about the pivot axis when the vehicle mount portion is mounted to the vehicle and the panel mount portion is mounted to or included in the panel. The vehicle mount portion includes first engagement features and the panel mount portion includes second engagement features, the first and second engagement features being operable to engage one another upon clamping the first and second engagement features together to thereby prevent pivoting of the panel relative to the vehicle.

An exemplary method of adjusting an air-deflecting panel includes pivotally mounting the air-deflecting panel to the vehicle with at least first and second spaced mounts, the air-deflecting panel comprising a panel comprised of elastically flexible material; adjusting the first mount to a first angle relative to the vehicle, the first angle corresponding to a first dimension of a trailer of the vehicle; and adjusting a second mount to a second angle relative to the vehicle, the second angle being different from the first angle and corresponding to a second dimension of the trailer, whereby adjusting the second mount to the second angle while the first mount is at the first angle warps the panel to a non-planar shape that can correspond to the shape of the trailer; and locking the first and second mounts at the first and second angles, respectively.

DETAILED DESCRIPTION

The inventive concepts are not limited to the specific exemplary embodiments described below. Air-deflecting vehicle panels are positioned to guide the flow of air away from or along surfaces of a vehicle. Specific examples of air-deflecting vehicle panels include side extenders and roof spoilers. For convenience, however, this description proceeds with respect to describing an application involving side extenders. It should be appreciated that this description also encompasses roof spoilers and other air-deflecting vehicle panels as well.

Figure 1:
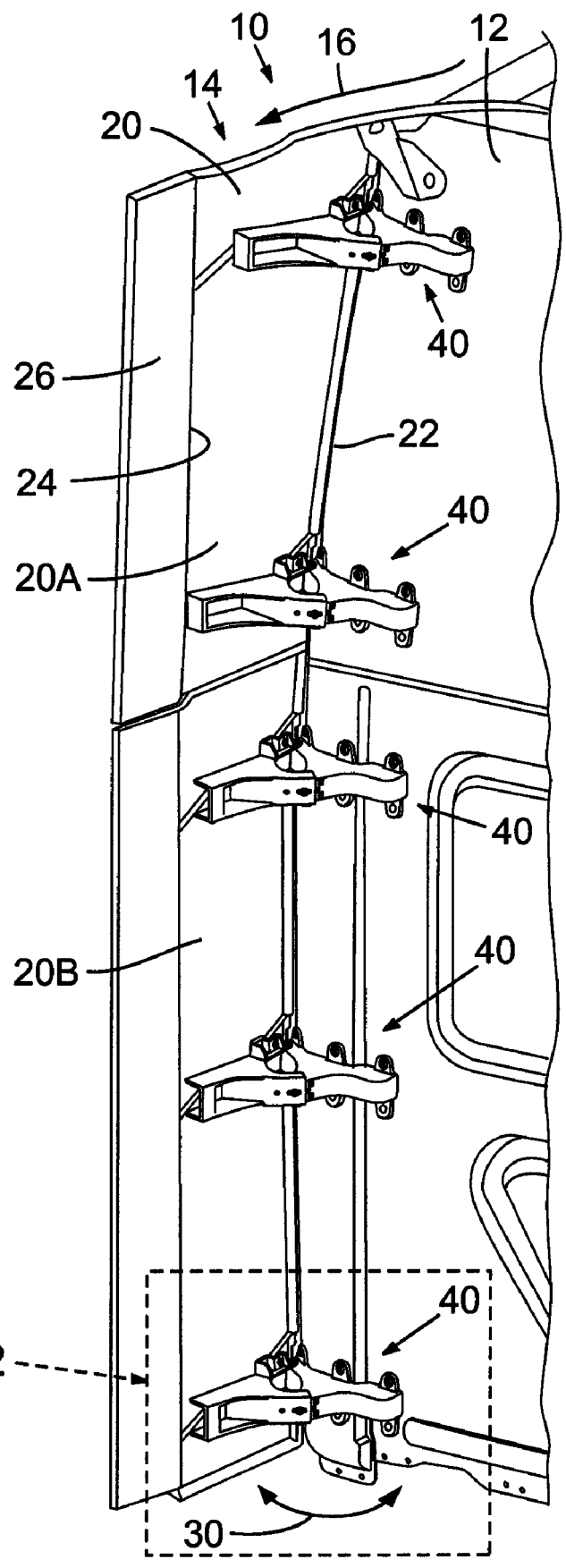
FIG. 1 is a rear view of an exemplary adjustable air-deflecting panel attached to the rear of a vehicle with a plurality of mounts.

With reference to FIG. 1, a portion of a truck 10 having a cab 12 is shown. A side extender, or vehicle air deflection panel, 14 is shown coupled to the cab 12 in a position to deflect air traveling along the sides of the truck as the truck is moving in a forward direction away from the area behind the cab. The air flow is represented by the arrow 16. The illustrated extender 14 optionally includes a first panel portion 20 having a forward side edge portion 22. Panel 20 also comprises an upright distal or rear side edge portion 24 spaced from cab 12. An optional edge extension portion 26 is shown mounted to the rear edge portion of panel 20. Such mounting can be accomplished in any suitable manner, such as known in the art. The panel 20 and the edge portion 26 can both be of single piece construction, or they can comprise a plurality of components, such as upper and lower sections. In FIG. 1, an upper panel section of panel 20 is indicated at 20A and a lower panel section is indicated at 20B.

The extender 14 is coupled to cab 12 so as to be adjustable relative to the cab. More specifically, the extender 14 can be shifted, and more desirably pivoted, in either direction indicated by double headed arrow 30, relative to the cab to shift the panel 14 to a greater or lesser extent into the airstream traveling along the sides of the cab.

In the embodiment shown in FIG. 1, this adjustability is accomplished by a plurality of adjustable mounts that mount the extender 14 to the cab. In FIG. 1, five of such mounts, each indicated by the number 40, are shown spaced apart along the length of the panel. In FIG. 1, two such mounts are shown for mounting the upper panel section 20A to the cab and three such mounts are shown for mounting the lower panel 20B to the cab.

Figure 2:
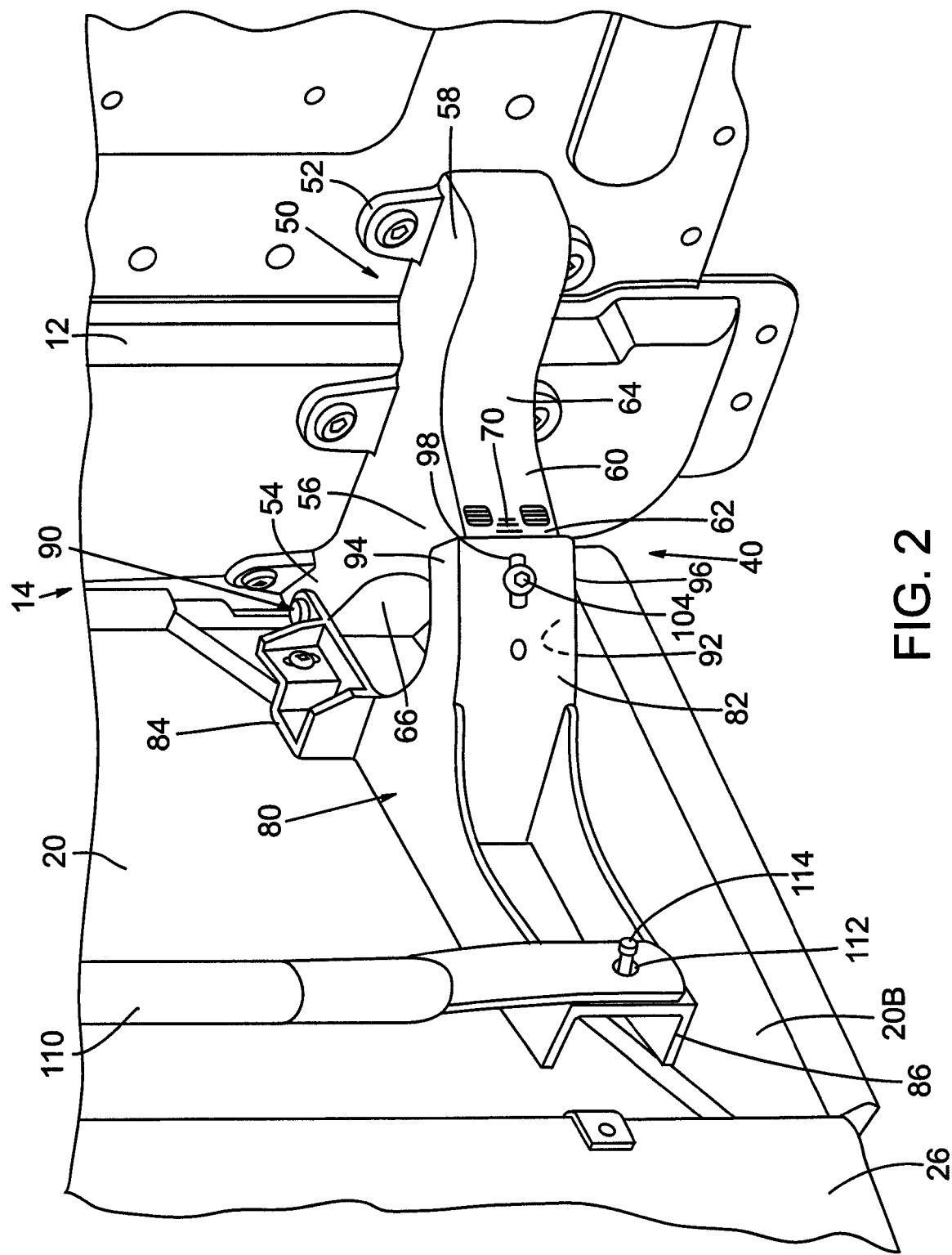
FIG. 2 is a detailed view one of the mounts shown in FIG. 1, showing one portion of the mount attached to the panel and another portion of the mount attached to the vehicle, the two portions of the mount being pivotally connected to one another at one location and interfittingly engaged with one another at another location.
Figure 3:
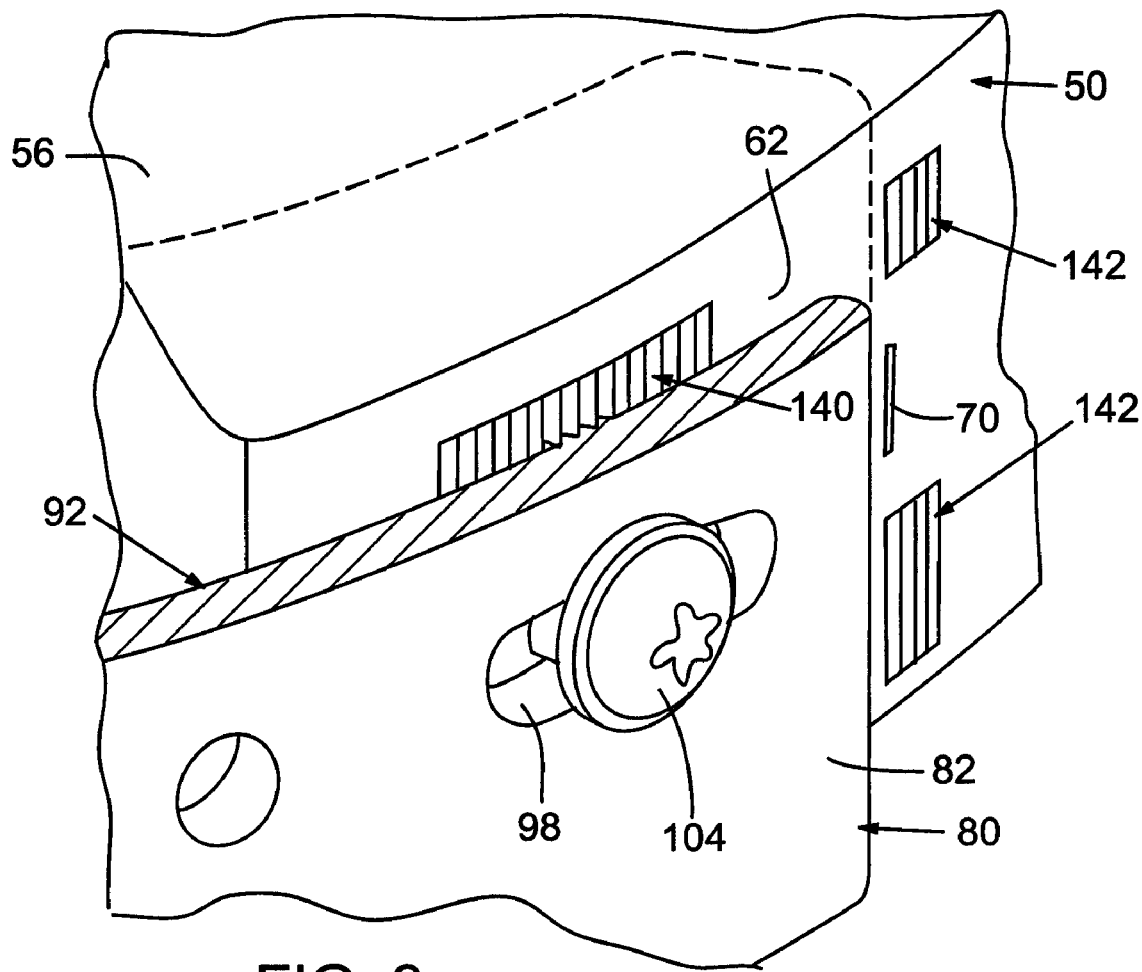
FIG. 3 is a detailed view of an interfitting engagement portion of the mount of FIG. 2.

FIG. 2 is an enlarged view of an embodiment of one such support or mount 40. In FIG. 2, mount 40 comprises a first vehicle mount portion 50 with a plurality of cab mounting flanges (one of which is indicated by the number 52 in FIG. 2) for receiving fasteners for mounting the mount portion 50 to the cab. The mount portion 50 comprises a body that includes a pivot support portion 54, a projecting central or intermediate portion 56 and an end portion 58, with portion 56 being intermediate to the end portions 54, 58. A transition surface 60 extends between projecting portion 56 and end portion 58. Surface 62 comprises a first engagement surface. As best seen in FIG. 3, surface 62 is positioned between an upper wall surface of portion 56 of the first vehicle mount portion 50 and a lower wall surface (not numbered) of portion 56. Surface 60, adjacent to portion 56, can have a convex surface section 62 (see FIG. 2) and a concave surface section 64 adjacent to end portion 58. Surface 62 can comprise interfitting engagement or mating features, such as détente receiving recesses or projections for use in locking the extender in a desired position, such as described below. A concave surface 66, or other recess defining surface, can be provided intermediate the projection 56 and pivot receiving portion 54 so as to provide a gap to accommodate relative movement of mount portion 80 (described below) and the mount portion 50.

Position indicators, such as lines 70 or other visual markings, can be included on surface 62 to provide a visual indication of the position of the extender panel 20. In some embodiments, indicia can be included, such as on surface 62, to indicate predetermined side extender settings that correlate to specific trailer properties. For example, such indicia can correlate to various gap sizes between the rear of the cab 12 and the front of a trailer. For example, for a specific first relatively large gap distance, a first indicia corresponding to the panel 20 being positioned at a first distance out into the air stream for such a large gap distance can be used. Conversely, for a specific second gap distance less than the first gap distance, a second indicia corresponding to the panel being positioned to a lesser extent (less than the first distance) into the air stream passing along the cab can be used. This allows the side extenders to be quickly adjusted to a predetermined optimal setting for a particular gap size. Indicia on the mount can indicate the desired position for a given gap distance.

A second panel mount portion 80 is mounted, such as by fasteners, to the panel 20 and more desirably to an interior surface of the panel. Alternatively, the panel mount portion or extender mount can be formed integrally with the panel instead of being a separate component. For example, the mount portion 80 can be molded as a part of the panel in the case of a molded panel. Mount portion 80 comprises a base with a central or intermediate projecting portion 82, a pivot receiving end portion 84 and an end portion 86 spaced from end portion 84 with the intermediate portion 82 positioned between end portions 84, 86. End portion 84 can comprise upper and lower flanges that define a channel therebetween into which a portion of end portion 54 can be inserted. A pivot pin 90, which can comprise, for example, a bolt, is inserted through openings in the respective upper and lower flanges and through an opening in end portion 54 to pivot components 50 and 80 together for pivoting about a pivot axis. The pivot axis can be generally upright, and in some embodiments is desirably vertical. In embodiments having two more side extender panel portions, such as 20a and 20b, one panel portion can be mounted on mounts having a vertical pivot axis, while another panel portion can be mounted on mounts having a tilted pivot axis. This can be beneficial where the side of the cab is curved inward near the roof, as shown in FIG. 1. Projecting portion 82 comprises an interior or back surface indicated by dashed line 92 in FIG. 2, positioned to abut the outer or front surface 62 of the projecting portion 56 of mount 50. Surface 92 comprises a second engagement surface. Surface 92 can be concave to accommodate the convex surface 62.

In one exemplary embodiment, the first engagement surface 62 comprises an arcuate convex surface portion of a first radius perpendicular to the pivot axis of pivot 90 and extending from the pivot axis, the second engagement surface 92 comprises an arcuate concave surface portion of a second radius perpendicular to the pivot axis and extending from the pivot axis, the second radius being greater than the first radius and dimensioned such that the surface portions 62 and 92 are slidably coupled together prior to being clamped together. The first and second engagement surfaces 62, 92 slide adjacent to one another as the panel 20 is pivoted from one position to another position.

In addition, interfitting, inter-engaging, mating or locking features can be provided in surface 92 for selective mating with corresponding interfitting features of surface 62 to selectively lock components 50, 80 against relative motion. Projecting portion 82 of the second panel mounting portion can comprise a channel portion with upper and lower channel defining flanges or flange portions 94, 96 which define a channel therebetween for receiving a portion of projection 56 and which operate to guide the relative motion of components 80 and 50. The flange portions 94, 96 define respective first and second channel walls (see FIG. 2) with a base portion, a portion of surface 92, being positioned at the interior of the channel portion and extending between the first and second channel walls. A slot 98 can be provided in extender mount end portion 82, oriented in a direction to accommodate the motion of component 80 relative to component 50 about the axis of pivot 90. Thus, as can be seen in FIGS. 2 and 3, the slot 98 is elongated in the direction of sliding of the first surface portion 62 relative to the second surface portion 92. A fastener, such as a set screw 104, extends through a fastener receiving slot 98 and into a threaded opening in portion 56 of cab mount 50. By tightening set screw 104, surfaces 62, 92 are urged together and lock the interfitting features of these surfaces to thereby prevent relative motion of the extender 14 and cab 12 until such time as set screw 104 is loosened to again permit such motion. Thus, upon clamping the first and second engagement surfaces 62, 92 together, pivoting of the panel 20 about the pivot axis of the pivot pin 90 and relative to the vehicle is prevented. That is, the illustrated fastener is operable when pivoted in a first direction to clamp the first and second surfaces 62, 92 together and when pivoted in a second direction opposite to the first direction to release the first and second surface from clamped engagement so as to permit relative sliding of the first and second surfaces. Alternative forms of fasteners or clamps can be used to cause the engagement of the interfitting features to lock the extender in place.

Figure 5:
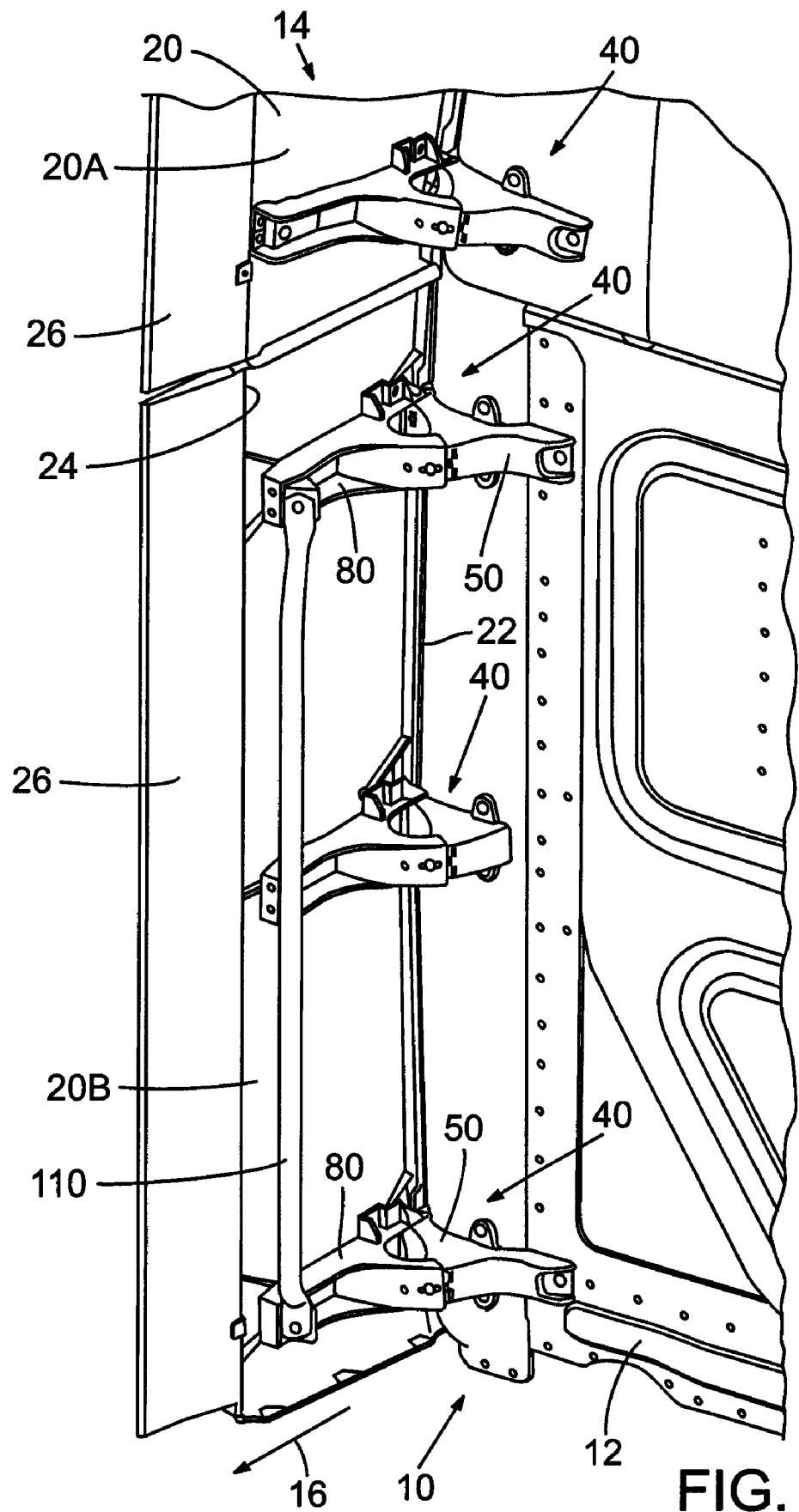
FIG. 5 shows an alternative embodiment of the adjustable air-deflecting panel shown in FIG. 1, having a handle interconnecting two of the mounts.

When the set screw 104 of each of the couplers is loosened, the couplers or mounts 40 can simultaneously be adjusted because the side extender panels assist in maintaining the alignment of the extender as such adjustment is accomplished. An optional elongated grab bar, or handle, 110, as shown in FIGS. 2 and 5, can engage end portion 86 of mount portion 80, and can similarly engage the corresponding end portions 86 of one or more other adjustable couplers 40 as shown in FIG. 5. In the embodiment of FIG. 2, handle 110 defines an opening 112 for receiving a pin 114 projecting outwardly from portion 86 of mount portion 80. This pin 114 is a grab handle mounting projection extending away from the panel. A fastener, such as a nut, can be secured to pin 114 (which can be threaded) for securing handle 110 to mount portion 80. Similar openings and fasteners, or alternative fasteners, can be used to connect the handle 110 to the extender mounts of couplers 40.

Figure 4:
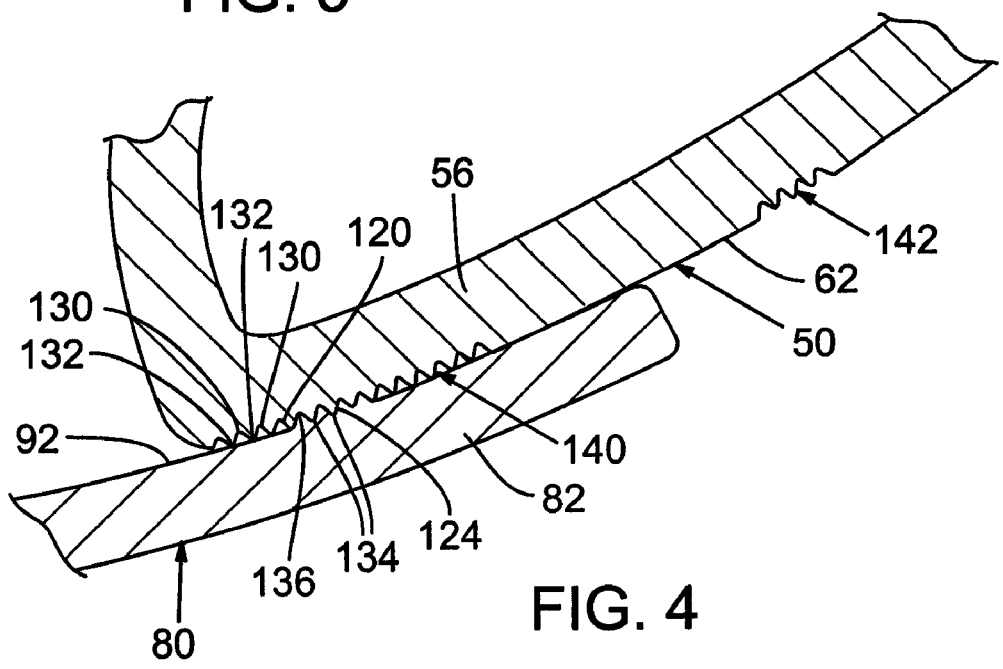
FIG. 4 is a cross-sectional view of the interfitting engagement portion shown in FIG. 3.

With reference to FIGS. 3 and 4, the interfitting features in this particular embodiment are shown as plural dátentes or dátente features 120 on surface 62 of mount portion 50 and corresponding interfitting or mating features 124 on surface 92 of mount portion 80. Although not limited to this form of interfitting features, in the illustrated embodiment, features 120 comprise a plurality of upright or vertically oriented grooves (some of which are numbered as 130) separated from one another by a plurality of upright or vertically oriented ridges (some of which are numbered as 132). The plurality of projections and grooves can be oriented parallel to, or in the direction of, the pivot axis of pivot 90. Similar grooves 134 and ridges 136 are provided in surface 92 of section 82 of extender mount 80. As can be seen in FIG. 4, when set screw 104 is tightened, ridges 132 are urged into corresponding grooves 134 and ridges 136 are urged into corresponding grooves 130 to lock the mounts 50, 80 together against relative pivoting motion. In contrast, when set screw 104 is loosened sufficiently, the peaks and grooves of the respective components can be separated to permit relative sliding and pivoting of these components to a new position.

Upper and lower sets of the interfitting features (above and below set screw 104) can be provided. In addition, at least one of the interfitting features can include first and second sets 140, 142 of such interfitting features, which can be provided on surface 62 spaced apart from one another. One set of inter-engaging features, such as set 140, can be positioned such that when clamped together with mating features 124 the extender panel is locked at an obtuse angle relative to the rear wall surface of the vehicle. Another set of inter-engaging features, such as set 142, can be positioned such that when clamped together the extender panel is locked at an acute angle relative to the rear wall surface of the vehicle. The set 142 can be used, for example, to allow further inboard pivoting or rotation of the extender 14 to be entirely out of airstream 16, for example, if the truck is being towed in reverse. Although variable, desirably there can be sufficient ridges on the mount or bracket surfaces to allow a plus or minus 3 degree rotation from a nominal position.

It should be noted that, in FIG. 4 the inner mating features are schematically shown. In addition, in FIG. 3 the upper flange 94 (shown in FIG. 2) has been eliminated and a portion of end portion 82 has been removed to provide some visibility to the exemplary mating features.

The side extender panels 20, the supports 40, the handle 110, and other components described herein can be constructed of various materials, with examples including steel, aluminum, plastic, fiber reinforced composite materials, and other polymeric materials. In one example, the supports 40 can comprise a 60% glass filled nylon material. It should be noted that different components can comprise different materials, e.g., the vehicle mounts 50 can be made of steel while the extender mounts 80 can be made of plastic, the handles 110 can be made of aluminum, and the side extender panels 20 can be made of a fiber reinforced composite. Other materials and combinations of materials can also be used.

In some embodiments, the side extender panels 20 are made of a flexible material that allow the panels to elastically flex, or warp. Exemplary warpable panel material can include thin sheet metal, elastic polymers, and fiber reinforced composites. It can be aerodynamically advantageous to warp the panels 20 to conform to the contours of an irregularly shaped trailer. For example, when towing a cylindrical tanker trailer, it may be desirable to have the upper portions of the panel 20 at a different angle than a middle portion of the panel, thereby deflecting air in a larger angle away from the cab at the middle of the panel, corresponding to a wider middle portion of the tanker trailer and deflecting air less at the narrower top of the tanker trailer with a less outwardly deflected upper portion of the panel. A warpable panel can be set in a warped position by adjusting the supports 40 to different pivot angles. Since each support 40 can have an independent hinge at its pivot axis 90, the supports of this construction can be adjusted independently as desired to warp the panel 20. In some embodiments, the handles 110 can be removed to allow adjustment of the supports 40 to different angles. In other embodiments, the handle 110 can be sufficiently flexible to accommodate warping of the panel 20.

Having illustrated and described the principles of the invention with reference to exemplary embodiments, it should be apparent to those of ordinary skill in the art that such features may be modified in arrangement and detail without departing from the inventive principles described herein. All such modifications are encompassed within the scope of the invention.

We claim:

1. An adjustable air-deflecting panel for mounting to a vehicle comprising:
   at least one panel;
   a plurality of mounts adapted for mounting the panel to the vehicle, each mount comprising a first vehicle mount portion for mounting to the vehicle and a second panel mount portion for mounting the panel to the first vehicle mount portion, the first vehicle mount portion being pivoted to the second panel mount portion so as to pivot about an axis to thereby pivotally couple the panel to the vehicle for pivoting about the pivot axis, the first vehicle mount portion comprising a first engagement surface and the second panel mount portion comprising a second engagement surface, the first and second engagement surfaces sliding adjacent to one another as the panel is pivoted from one position to another position, the first and second engagement surfaces comprising respective inter-engaging features operable to engage one another upon clamping the first and second engagement surfaces together to thereby prevent pivoting of the panel about the pivot axis relative to the vehicle.

2. An adjustable air-deflecting panel according to claim 1 wherein the inter-engaging features comprise plural detents.

3. An adjustable air-deflecting panel according to claim 1 wherein the inter-engaging features comprise a plurality of projections and grooves oriented parallel to the direction of the pivot axis.

4. An adjustable air-deflecting panel according to claim 1 wherein the first engagement surface comprises an arcuate convex surface portion of a first radius perpendicular to the pivot axis and extending from the pivot axis, the second engagement surface comprises an arcuate concave surface portion of a second radius perpendicular to the pivot axis and extending from the pivot axis, the second radius being greater than the first radius and dimensioned such that the first and second engagement surfaces are slidably coupled together prior to being clamped together.

5. An adjustable air-deflecting panel according to claim 4 wherein the first vehicle mount portion comprises upper and lower wall surfaces with the first engagement surface being positioned between the upper and lower wall surfaces, and wherein the second panel mount portion comprises a channel portion with upper and lower flange portions defining respective first and second channel walls and a base portion extending between the first and second channel walls, and the second engagement surface comprising a portion of the base portion and being positioned at the interior of the channel portion between the first and second channel walls.

6. An adjustable air-deflecting panel according to claim 5 wherein the base portion comprises a fastener receiving slot elongated in the direction of sliding of the first engagement surface relative to the second engagement surface and a fastener passing through the slot and being threaded into the first surface portion, whereby the fastener is operable when pivoted in a first direction to clamp the first and second engagement surfaces together and when pivoted in a second direction opposite to the first direction to release the first and second engagement surfaces from clamped engagement so as to permit relative sliding of the first and second surfaces.

7. An adjustable air-deflecting panel according to claim 1 wherein the air-deflecting panel comprises a side extender panel and wherein the inter-engaging features comprise first and second sets of spaced apart inter-engaging features, the first set of inter-engaging features being positioned such that when clamped together the side extender panel is locked at an obtuse angle relative to a rear wall surface of the vehicle, and the second set of inter-engaging features being positioned such that when clamped together the side extender panel is locked at an acute angle relative to a rear wall surface of the vehicle.

8. An adjustable air-deflecting panel according to claim 4 wherein the air-deflecting panel comprises a side extender panel and wherein the inter-engaging features comprise first and second sets of spaced apart inter-engaging features, the first set of inter-engaging features being positioned such that when clamped together the panel is locked at an obtuse angle relative to a rear wall surface of the vehicle, and the second set of inter-engaging features being positioned such that when clamped together the panel is locked at an acute angle relative to a rear wall surface of the vehicle.

9. An adjustable air-deflecting panel according to claim 1 comprising position indicators on at least one of the first vehicle mount portion and second panel mount portion to indicate the pivot position of the panel.

10. An adjustable air-deflecting panel according to claim 1 wherein the second panel mount portion comprises a grab handle mounting projection extending away from the panel.

11. An adjustable air-deflecting panel for mounting to a vehicle comprising:
at least one panel;
a plurality of mounts adapted for mounting the panel to the vehicle, each mount comprising a first vehicle mount portion adapted for mounting to the vehicle and a second panel mount portion adapted for mounting to the panel, the first vehicle mount portion being pivoted to the second panel mount portion so as to pivot about an axis to thereby pivotally couple the panel to the vehicle for pivoting about the pivot axis, the first vehicle mount portion and the second panel mount portion comprising means for engaging one another to prevent pivoting of the panel about the pivot axis relative to the vehicle.

* * * * *

UNITED STATES PATENT AND TRADEMARK OFFICE
CERTIFICATE OF CORRECTION

PATENT NO. : 8,403,401 B2  Page 1 of 1
APPLICATION NO. : 12/833642
DATED : March 26, 2013
INVENTOR(S) : Rinehart et al.

It is certified that error appears in the above-identified patent and that said Letters Patent is hereby corrected as shown below:

In the Specification:

Column 5, line 22, "dátentes" should read -- détentes --

Column 5, line 23, "dátente" should read -- détente --

Signed and Sealed this
Twenty-fourth Day of March, 2015

Michelle K. Lee
*Director of the United States Patent and Trademark Office*